UNITED STATES PATENT OFFICE.

JAMES G. ROMAN, OF WILMINGTON, DELAWARE.

COMPOUND FOR EXTERNAL APPLICATION.

1,350,842. Specification of Letters Patent. Patented Aug. 24, 1920.

No Drawing. Application filed August 12, 1918. Serial No. 249,496.

*To all whom it may concern:*

Be it known that I, JAMES G. ROMAN, a citizen of the United States, residing at Wilmington, New Castle county, and State of Delaware, have invented and discovered certain new and useful Improvements in Compounds for External Application, of which the following is a specification.

The object of my said invention is to provide an ointment for external use in the treatment of rheumatism, swollen joints, sore and aching muscles and other parts, all of which will be hereinafter more fully described and claimed.

Said compound consists of the following ingredients in substantially the proportions stated: 8 oz. turpentine, 3 oz. white of eggs, 3 oz. salt, ¼ oz. camphor, 3 oz. vinegar.

These ingredients are mixed and boiled until the product is the consistency of a paste, when it is cooled and ready for use.

It will be understood of course that the proportions may be somewhat varied and that the ingredients may be slightly varied without departing from my said invention. For instance, in the preparation I prefer to use wine vinegar but of course other vinegars may be used when wine vinegar is not available.

Having thus fully described my said invention, what I claim as new and desire to secure by Letters Patent, is:

A compound for external use consisting of a boiled mixture comprising a major portion of turpentine, and a minor portion of whites of egg, salt, camphor and vinegar.

In witness whereof, I have hereunto set my hand and seal at Washington, District of Columbia, this 12th day of August, A. D. nineteen hundred and eighteen.

JAMES G. ROMAN. [L. S.]

Witnesses:
HALLIE DYOTT,
KATHERINE CUSHMAN.